(12) United States Patent
Liang

(10) Patent No.: US 8,358,291 B2
(45) Date of Patent: Jan. 22, 2013

(54) STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 294 days.

(21) Appl. No.: 12/850,723

(22) Filed: Aug. 5, 2010

(65) Prior Publication Data

US 2011/0221710 A1 Sep. 15, 2011

(30) Foreign Application Priority Data

Mar. 12, 2010 (CN) .......................... 2010 1 0122308

(51) Int. Cl.
*G06F 3/033* (2006.01)
*B43K 1/10* (2006.01)

(52) U.S. Cl. ...................... 345/179; 401/258; 178/19.01

(58) Field of Classification Search ................... 345/179; 401/258; 178/19.01
See application file for complete search history.

(56) References Cited

U.S. PATENT DOCUMENTS

| | | | | |
|---|---|---|---|---|
| 5,850,059 A | * | 12/1998 | Yoshimura | 178/19.01 |
| 2003/0184529 A1 | * | 10/2003 | Chien et al. | 345/179 |
| 2007/0020037 A1 | * | 1/2007 | Liu | 401/259 |
| 2009/0050378 A1 | * | 2/2009 | Lee | 178/19.01 |
| 2009/0309854 A1 | * | 12/2009 | Hildebrandt et al. | 345/179 |
| 2011/0096039 A1 | * | 4/2011 | Liang | 345/179 |

* cited by examiner

*Primary Examiner* — Ariel Balaoing
(74) *Attorney, Agent, or Firm* — Altis Law Group, Inc.

(57) ABSTRACT

An exemplary stylus includes a barrel, two slide mechanisms, two housings and a head. The two housings are slidably coupled to the barrel by the two slide mechanisms. The head is attached to an outer end of one of the housings, and configured to contact a touch screen of an electronic device. The two housings cooperatively surround the barrel when the stylus is in a retracted position, and are slidable along two opposite directions to elongate the stylus.

15 Claims, 5 Drawing Sheets

STYLUS

BACKGROUND

1. Technical Field

This exemplary disclosure generally relates to retractable and extendable styluses.

2. Description of Related Art

Portable devices such as smart phones, personal digital assistants (PDAs), pagers, and personal organizers typically include touch screens and styluses for operation of the touch screens. However, the stylus often has a complex structure even when it is in the form of a straight rod.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

FIG. 2 shows an assembled perspective view of the exemplary stylus shown in FIG. 1, wherein the stylus is in a retracted position with the cap on.

FIG. 4 is similar to FIG. 3, but shows the stylus in an extended position with the cap still on.

DETAILED DESCRIPTION

In this exemplary embodiment, a stylus is used to contact a touch screen of an electronic device such as a mobile telephone. In a typical mobile telephone, the touch screen coincides with a display screen of the mobile telephone. The mobile telephone described herein is a representation of the type of wireless communication device that may benefit from the exemplary embodiment. However, it is to be understood that the exemplary embodiment may be applied to any type of handheld or portable device including, but not limited to, the following devices: radiotelephones, cordless phones, paging devices, personal digital assistants, portable computers, stylus body-based or keyboard-based handheld devices, remote control units, portable media players (such as an MP3 or DVD player) that have wireless communication capability, and the like. Accordingly, any reference herein to the mobile telephone should also be considered to apply equally to other portable wireless electronic devices.

Figure 1:
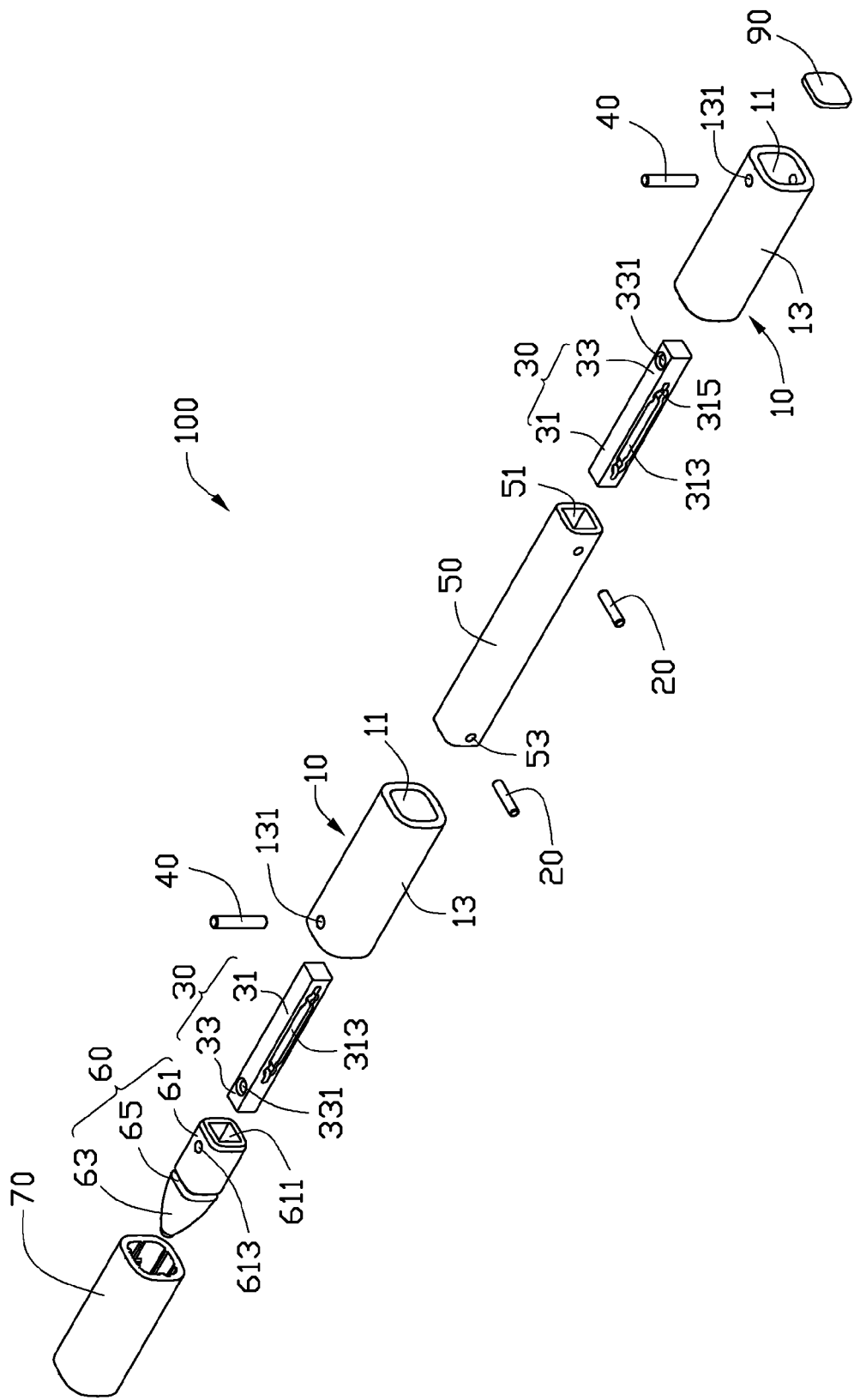
FIG. 1 shows an exploded perspective view of an exemplary stylus, the stylus including a cap.
Figure 2:
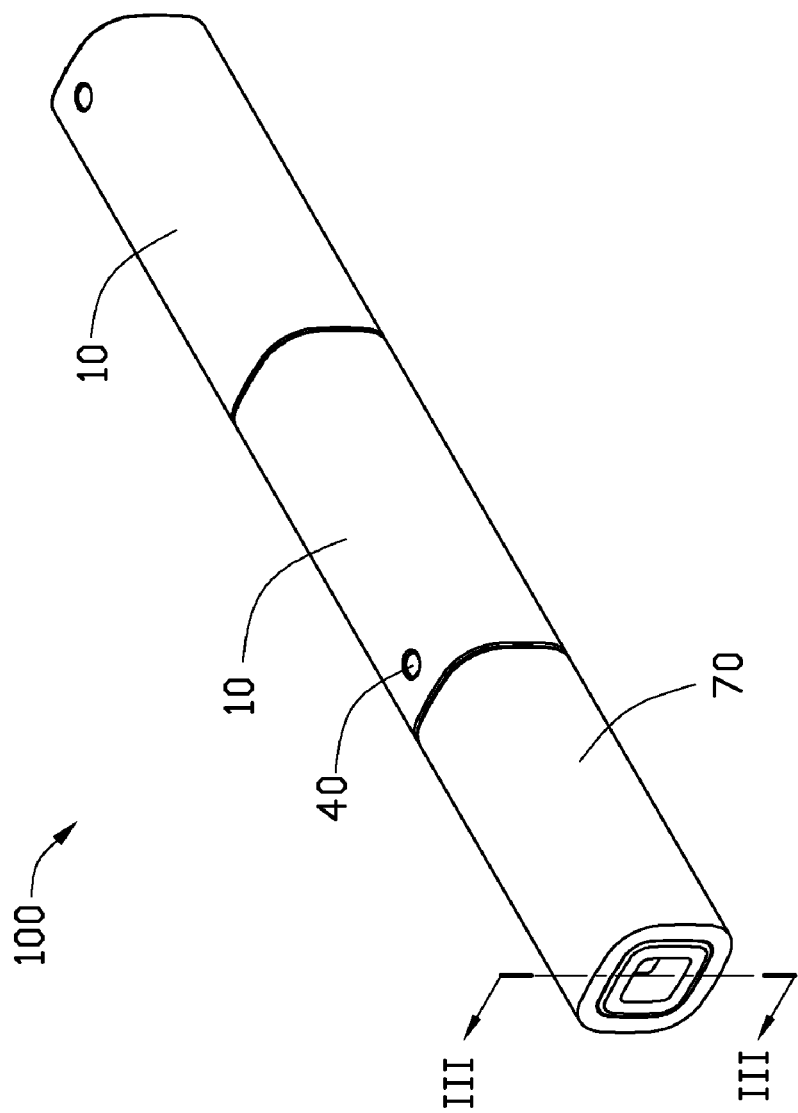

FIGS. 1 and 2 show a stylus 100 including two housings 10, a barrel 50, two slide mechanisms, a head 60, a cap 70 and a cover body 90. The two housings 10 are retractably and slidably coupled to two ends of the barrel 50 by the two slide mechanisms respectively. The two housings 10 cooperatively surround the barrel 50 when the stylus 100 is in a retracted position (shown in FIG. 3), and can slide adversely to the two ends of the barrel 50 to elongate the stylus 100 in an extended position (shown in FIG. 4). The head 60 is assembled to one end of one housing 10, and can contact and press a touch screen display of an electronic device. The cap 70 is detachably attached to the head 60 for protecting the head 60 from damage. The cover body 90 is assembled to one end of the other housing 10 opposite to the head 60.

Each housing 10 is tubular and of any suitable manufacture. For example, the housing 10 may be constructed of a lightweight metal such as stainless steel or aluminum alloy. The housing 10 is hollow; and has a through receptacle 11 longitudinally defined therein, and a peripheral wall 13 enclosing the receptacle 11. A pair of fixing holes 131 is defined through the peripheral wall of one end of the housing 10, for engaging of the corresponding slide mechanism in the end of the housing 10 (see below).

The barrel 50 is a substantially hollow cylinder with a size slightly smaller than that of the receptacle 11 of each housing 10, and is longer than each housing 10, so that the two housings 10 can slidably surround the barrel 50 when the stylus 100 is in the retracted position. In this present embodiment, the length of the barrel 50 is substantially the same as the combined length of the two housings 10. The barrel 50 includes an axial through hole 51 defined therethrough. A pair of mounting holes 53 is defined in the peripheral wall of each of two opposite ends of the barrel 50.

Figure 3:
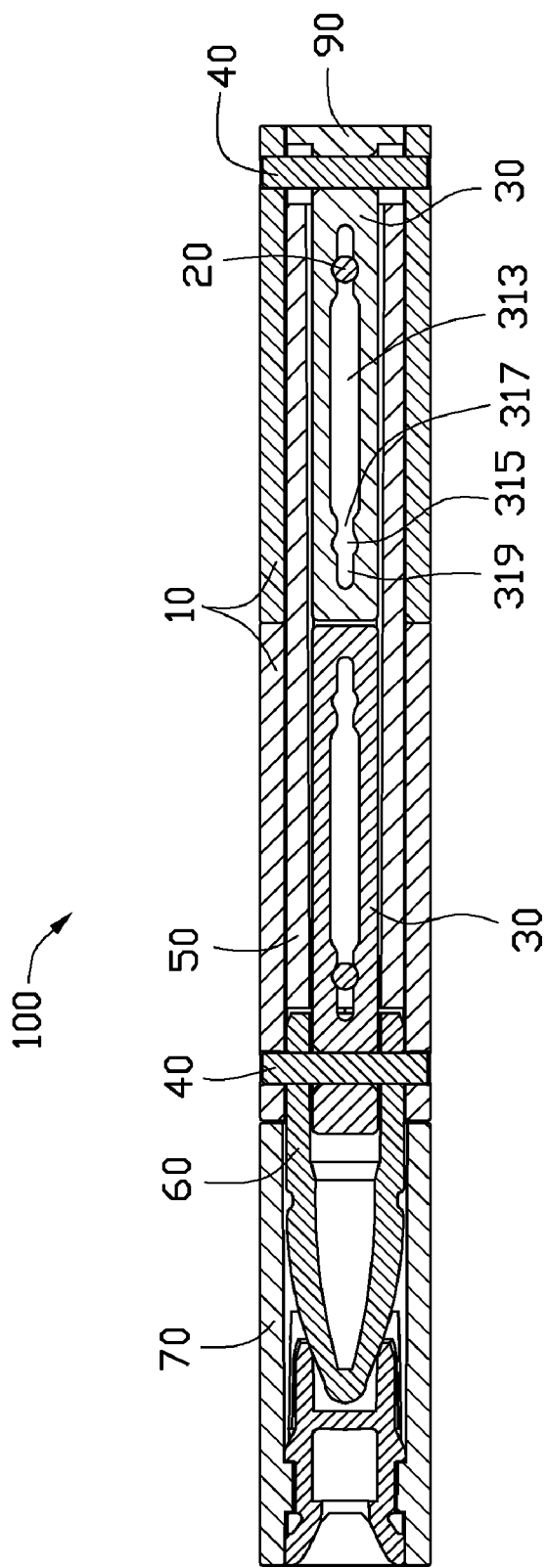
FIG. 3 shows a cross-sectional view of the stylus taken along line III-III of FIG. 2.

Referring to FIG. 3, the two slide mechanisms are respectively secured to and accommodated within the two housings 10. Each slide mechanism is secured within the receptacle 11 of the corresponding housing 10, and slidably mounted to the end of the barrel 50. Each slide mechanism includes a guiding post 20, and a guiding groove 313 engagingly receiving the guiding post 20. The guiding post 20 is secured to one corresponding end of the barrel 50. The guiding groove 313 is defined in a corresponding guiding member 30. A width of the guiding groove 313 is slightly larger than the diameter of the guiding post 20, such that the guiding post 20 can pass through the guiding groove 313 and slide relative to the guiding member 30 along the guiding groove 313. The guiding member 30 is secured to the housing 10. The guiding member 30 includes a main body 31, and a fixing portion 33 formed at one end of the main body 31. The guiding groove 313 is defined longitudinally through the main body 31.

The main body 31 of the guiding member 30 includes two stopping holes 315 defined adjacent to two opposite ends of the guiding groove 313, respectively. Each stopping hole 315 communicates with the guiding groove 313 by a slit 317 defined between the stopping hole 315 and the guiding groove 313. A transverse width of the slit 317 is slightly smaller than the diameter of the guiding post 20, and a diameter of the stopping hole 315 is substantially the same as that of the guiding post 20, so that the guiding post 20 can interferentially pass through the slit 317 and latch into the stopping hole 315. Each of the two stopping holes 315 can lock the guiding post 20 in position. The fixing portion 33 includes an installing hole 331 defined therethrough. The installing hole 331 corresponds to the fixing holes 131, and enables the guiding member 30 to be secured to the housing 10 (see below).

The head 60 includes a connecting portion 61, and a touching portion 63 extending from the connecting portion 61. The connecting portion 61 is a hollow rectangular post, with a cross-sectional shape and size substantially the same as those of the receptacle 11 of the housing 10. An aperture 611 is defined in one end of the connecting portion 61, with a shape and a cross-sectional size of the aperture 611 substantially the same as those of the fixing portion 33 of the guiding member 30. A pair of connecting holes 613 is defined through the peripheral wall of the connecting portion 61, corresponding to the installing hole 331 of the guiding member 30 and the fixing hole 131 of the housing 10. The touching portion 63 can touch and press the touch screen display of the electronic device. A circumferential (approximately annular) latching slot 65 is defined approximately at a junction where the touching portion 63 and the connecting portion 61 meet, for latchingly receiving the cap 70 (see below).

Figure 5:
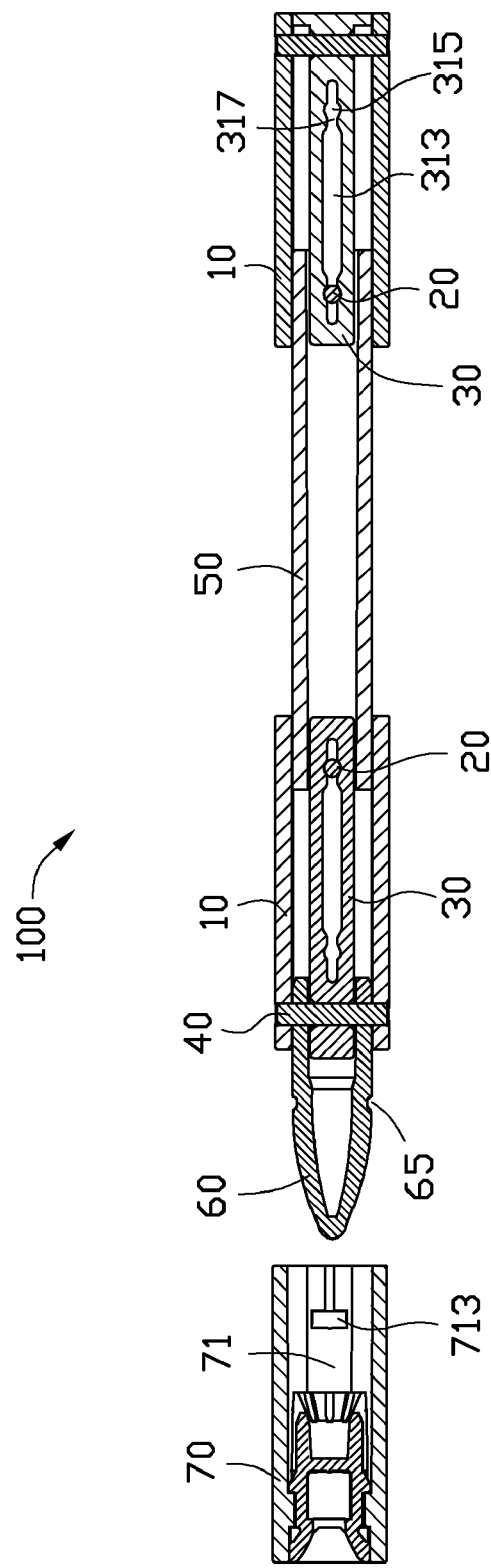
FIG. 5 is similar to FIG. 4, but shows the stylus in the extended position with the cap removed.

Referring to FIG. 5, the cap 70 is substantially hollow. The cap 70 has substantially the same shape as each housing 10, and is slightly shorter than each housing 10. The cap 70 defines an accommodating space 71 at one end thereof nearest to the cover body 90. The accommodating space 71 can receive the head 60 therein. A latching protrusion 713 protrudes from an inner wall of the accommodating space 71 of the cap 70, corresponding to the latching slot 65. The latching protrusion 713 engages in the latching slot 65 when the cap 70 completely covers the touching portion 63 of the head 60, thereby enabling the cap 70 to protect the touching portion 63 from damage.

The cover body 90 has substantially the same cross-sectional shape and size as those of the receptacle 11 of the corresponding housing 10. The cover body 90 is held within one end of one housing 10 farthest from the head 60.

Referring to FIGS. 1 and 3-5, during assembly of the stylus 100, the two guiding members 30 are inserted into the axial through hole 51 towards each other from the two opposite ends of the barrel 50. The fixing portion 33 of each guiding member 30 is exposed to the outside of the corresponding end of the barrel 50. The guiding groove 313 of the guiding member 30 aligns with the corresponding mounting holes 53. One of two guiding posts 20 is passed through the mounting holes 53 and the guiding groove 313, whereby the guiding member 30 is slidably mounted in the barrel 50. The other guiding member 30 is slidably mounted in the barrel 50 in the same way.

Then the two housings 10 are assembled to the two ends of the barrel 50, and secured to the two guiding member 30 respectively. Detailedly, the fixing holes 131 of one housing 10 align with the corresponding installing hole 331. The connecting portion 61 of the head 60 is inserted into the corresponding housing 10, with the connecting holes 613 aligning with the corresponding installing hole 331 and fixing holes 131. One of two fixing posts 40 passes through the fixing holes 131, the installing hole 331 and the connecting holes 613 to secure the head 60, the housing 10 and the guiding member 30 together as an integrated unit. The fixing holes 131 of the other housing 10 align with the corresponding installing hole 331. The other of the two fixing posts 40 passes through the corresponding fixing holes 131 and installing hole 331 to secure the other housing 10 and the other guiding member 30 together as an integrated unit. Thus, the two housings 10 can slide relative to the two ends of the barrel 50 by operation of the corresponding slide mechanisms. After that, the cover body 90 is received within and attached to the end of the corresponding housing 10 farthest from the head 60. Finally, the cap 70 encloses the touching portion 63, with the latching protrusion 713 latching in the latching slot 65.

Figure 4:
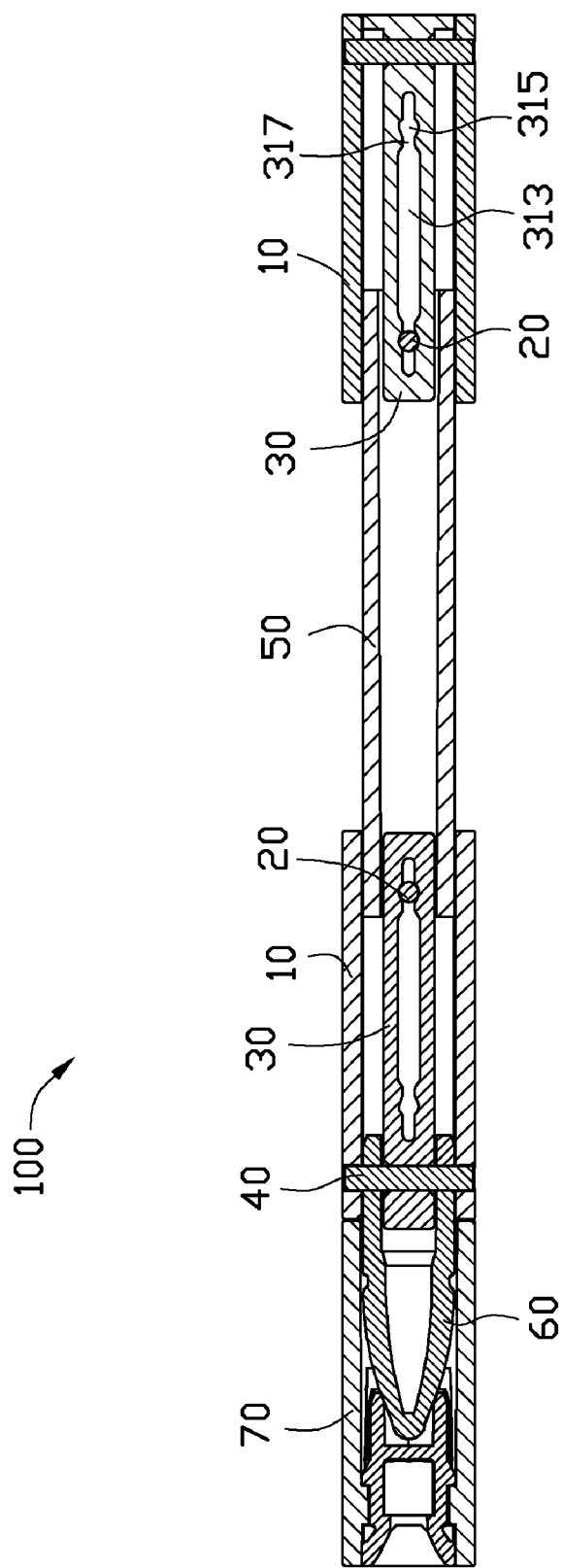

Referring to FIGS. 3-5, in use of the stylus 100, the two housings 10 abut each other in an initial position (i.e., the retracted position of the stylus 100) as shown in FIG. 3. In this position, the two guiding posts 20 are latched in the corresponding stopping holes 315 of the outer ends of the guiding members 30. Then the two housings 10 are extended by two opposite external forces, enabling one housing 10 together with the corresponding slide mechanism and the other housing 10 together with the corresponding slide mechanism and the head 60 to slide out of the barrel 50 to fully extended positions (i.e., the extended position of the stylus 100) as shown in FIG. 4. During these sliding processes, the guiding grooves 313 move relative to the corresponding guiding posts 20 until the guiding posts 20 latch into the corresponding stopping holes 315 of the inner ends of the guiding members 30. Next, the cap 70 is pulled away from the head 60, with the latching protrusion 713 riding out and disengaging from the latching slot 65 of the head 60. The stylus 100 is thereby ready to use.

It is to be further understood that even though numerous characteristics and advantages of the exemplary embodiments have been set forth in the foregoing description, together with details of structures and functions of various embodiments, the disclosure is illustrative only, and that changes may be made in detail, especially in matters of shape, size, and arrangement of parts within the principles of the exemplary embodiments to the full extent indicated by the broad general meaning of the terms in which the appended claims are expressed.

What is claimed is:

1. A stylus, comprising:
   a barrel;
   two slide mechanisms;
   two housings slidably coupled to the barrel by the two slide mechanisms, respectively; and
   a head attached to an outer end of one of the housings, and configured to contact a touch screen of an electronic device;
   wherein, the two housings cooperatively surround the barrel when the stylus is in a retracted position, and are slidable along two opposite directions to elongate the stylus;
   wherein each slide mechanism includes a guiding post and a guiding member, the guiding member is secured within a corresponding one of the two housings and defines a guiding groove slidably receiving the guiding post; and the guiding post is secured to an end of the barrel such that the housing is slidably mounted to the barrel;
   wherein the housing includes a pair of fixing holes defined through a peripheral wall of one end thereof, for engaging of the corresponding slide mechanism with the end of the housing; and
   wherein each guiding member includes a main body and a fixing portion, the guiding groove is defined through the main body; the fixing portion defines an installing hole therethrough corresponding to the fixing holes of the housing; and a fixing post passes through the fixing holes and the installing hole, with two ends of the fixing post fixed in the fixing holes of the housing.

2. The stylus of claim 1, wherein each housing has a receptacle defined longitudinally therethrough and a peripheral wall enclosing the receptacle; and when the two housings are slid along the opposite directions to fully extended positions, the stylus is in an extended position.

3. The stylus of claim 2, wherein each of the two slide mechanisms is received within the receptacle of a corresponding housing and secured to the housing, and is slidably mounted to a corresponding end of the barrel.

4. The stylus of claim 3, wherein a transverse width of the guiding groove is slightly larger than a diameter of the guiding post, such that the guiding member at the guiding groove can slide along the guiding post.

5. The stylus of claim 4, wherein the barrel is in the shape of a hollow cylinder and includes an axial through hole defined therethrough and a pair of mounting holes defined in each of two opposite ends of a peripheral wall thereof; the guiding posts are fixed in the pairs of mounting holes, respectively; and the two guiding members are axially slidable along two portions of the axial through hole, respectively.

6. The stylus of claim 5, wherein the main body further defines two stopping holes located adjacent to opposite ends of the guiding groove, respectively, and each stopping hole communicates with the guiding groove by a narrowed slit located between the stopping hole and the guiding groove.

7. The stylus of claim 6, wherein a transverse width of the slit is slightly smaller than the diameter of the guiding post, and a diameter of the stopping hole is substantially the same as the diameter of the guiding post, so that the guiding post can interferentially pass through the slit and latch into the stopping hole.

8. The stylus of claim 1, wherein the head includes a connecting portion and a touching portion extending from one end of the connecting portion; the connecting portion is a hollow post having an aperture defined in one end thereof and a pair of connecting holes defined in a peripheral wall of the end thereof; and the connecting portion is received in the outer end of said one of the housings.

9. The stylus of claim 8, further comprising a cap, wherein the head further includes a circumferential latching slot defined approximately at a junction where the touching portion and the connecting portion meet; the cap includes an accommodating space at one end thereof nearest to the cover body and a latching protrusion protruding from an inner wall of the accommodating space corresponding to the latching slot; and the cap is detachably attached to the head with the latching protrusion engaging in the latching slot.

10. A stylus, comprising:
a barrel having an axial through hole defined therein;
two slide mechanisms slidably assembled to two opposite ends of the barrel and at least partially received in the axial through hole at all times;
two housings respectively secured to the two slide mechanisms and thereby slidably coupled to the two ends of the barrel; and
a head fixed to an end of one of the housings farthest from the other housing;
wherein, the two housings cooperatively enclose the barrel when the housings are in retracted positions, and are slidable in opposite directions from the retracted positions to extended positions to provide the stylus with greater length;
wherein each of the two slide mechanisms includes a guiding post and a guiding member, the guiding member is secured to the housing and defines a guiding groove slidably receiving the guiding post; and the guiding post is secured to the end of the barrel such that the housing is slidably mounted to the barrel; and
wherein the housing includes a fixing hole defined through one end thereof, each guiding member includes a main body and a fixing portion, the guiding groove is defined through the main body; the fixing portion defines an installing hole therethrough corresponding to the fixing holes of the housing; and a fixing post passes through the fixing holes and the installing hole, with two ends of the fixing post fixed in the fixing holes of the housing.

11. The stylus of claim 10, wherein a transverse width of the guiding groove is slightly larger than a diameter of the guiding post, such that the guiding member at the guiding groove can slide along the guiding post.

12. A stylus, comprising:
a barrel;
two slide mechanisms;
two housings slidably coupled to the two ends of the barrel by the two slide mechanisms respectively; and
a head assembled to one end of one housing and configured to contact and press a touch screen display of an electronic device when the stylus is operated by a user;
wherein, the two housings cooperatively surround the barrel when the stylus is in a retracted position, and can slide adversely over the two ends of the barrel to elongate the stylus and bring the stylus to an extended position;
wherein each of the two slide mechanisms includes a guiding post and a guiding member, the guiding member is secured to the housing and defines a guiding groove slidably receiving the guiding post; and the guiding post is secured to the end of the barrel such that the housing is slidably mounted to the barrel; and
wherein the housing includes a fixing hole defined through one end thereof, each guiding member includes a main body and a fixing portion, the guiding groove is defined through the main body; the fixing portion defines an installing hole therethrough corresponding to the fixing holes of the housing; and a fixing post passes through the fixing holes and the installing hole, with two ends of the fixing post fixed in the fixing holes of the housing.

13. The stylus of claim 12, wherein the stylus further includes a cap, the cap is detachably attached to the head for protecting the head from damage.

14. The stylus of claim 12, wherein the housing is hollow and has a through receptacle longitudinally defined therethrough, and a peripheral wall enclosing the receptacle; the barrel is in the shape of a hollow cylinder with a size slightly smaller than that of the receptacle of each housing, and is longer than each housing, so that the two housings can slidably surround the barrel when the stylus is in the retracted position.

15. The stylus of claim 14, wherein the two slide mechanisms are respectively secured to and accommodated within the two housings, each slide mechanism is secured within the receptacle of the corresponding housing, and slidably mounted to the end of the barrel.

* * * * *